(12) United States Patent
Meng et al.

(10) Patent No.: US 12,731,791 B2
(45) Date of Patent: Sep. 8, 2026

(54) INTERFACE PROTECTION FOR ALL-SOLID-STATE BATTERIES

(71) Applicant: THE REGENTS OF THE UNIVERSITY OF CALIFORNIA, Oakland, CA (US)

(72) Inventors: Ying Shirley Meng, La Jolla, CA (US); Abhik Banerjee, Kolkata (IN); Hanmei Tang, Marina del Rey, CA (US); Erik Wu, San Diego, CA (US); Han Nguyen, San Diego, CA (US); Darren Huan Shen Tan, San Diego, CA (US); Jean-Marie Doux, Bordeaux (FR); Shyue Ping Ong, Menlo Park, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 629 days.

(21) Appl. No.: 17/913,110

(22) PCT Filed: Mar. 19, 2021

(86) PCT No.: PCT/US2021/023279
§ 371 (c)(1),
(2) Date: Sep. 20, 2022

(87) PCT Pub. No.: WO2021/188976
PCT Pub. Date: Sep. 23, 2021

(65) Prior Publication Data

US 2023/0113915 A1 Apr. 13, 2023

Related U.S. Application Data

(60) Provisional application No. 62/992,868, filed on Mar. 20, 2020.

(51) Int. Cl.
*H01M 4/62* (2006.01)
*H01M 4/02* (2006.01)
(Continued)

(52) U.S. Cl.
CPC ......... *H01M 4/628* (2013.01); *H01M 4/0402* (2013.01); *H01M 4/0433* (2013.01);
(Continued)

(58) Field of Classification Search
None
See application file for complete search history.

(56) References Cited

U.S. PATENT DOCUMENTS

2007/0218361 A1* 9/2007 Inoue .................. H01M 4/1391 429/223
2016/0351973 A1* 12/2016 Albano ................. H01M 4/628
(Continued)

FOREIGN PATENT DOCUMENTS

CN 103050705 A 4/2013

OTHER PUBLICATIONS

Yi et al, Structure and electrochemical performance of Li4Ti5O12-coated LiMn1.4Ni0.4Cr0.2O4 spinel as 5 V materials, 2009, Electrochemistry Communications (Year: 2009).*
(Continued)

*Primary Examiner* — Brian R Ohara
(74) *Attorney, Agent, or Firm* — Eleanor Musick; Torrey Pines Law Group PC

(57) ABSTRACT

An interfacial protective coating layer of LTO is effective in preventing unwanted interfacial reactions between the solid-state electrolyte and cathode electrodes from occurring. Incorporation of the inventive coating into sodium-based all-solid-state batteries allows for room temperature operation, high voltage, and long cycle life.

11 Claims, 7 Drawing Sheets

(51) Int. Cl.
*H01M 4/04* (2006.01)
*H01M 10/0562* (2010.01)

(52) U.S. Cl.
CPC .. *H01M 10/0562* (2013.01); *H01M 2004/028* (2013.01); *H01M 2300/0068* (2013.01)

(56) References Cited

U.S. PATENT DOCUMENTS

2017/0084949 A1 3/2017 Yokoyama et al.
2018/0069230 A1 3/2018 Lee et al.
2018/0287167 A1 * 10/2018 Aryanpour .......... H01M 4/0416
2018/0323474 A1 11/2018 Liu et al.
2019/0198919 A1 * 6/2019 Makino ............... H01M 4/1393

OTHER PUBLICATIONS

Jingzhong Zhao, Yurong Liu, Yi He, Kathy Lu, "Li4Ti5O12 epitaxial coating on LiNi0.5Mn1.5O4 surface for improving the electrochemical performance through solvothermal-assisted processing" Journal of Alloys and Compounds, vol. 779, 2019, pp. 978-984 (Year: 2019).*

R. J. Clement, et al. "Direct evidence for high Na+ mobility and high voltage structural processes in P2-Nax[LiyNizMn1yz]O2 cathodes from solid-state NMR and DFT calculations" J. Mater. Chem. A, 2017, 5, 4129 (Year: 2017).*

International Search Report and Written Opinion, PCT/US2021/023279, Jun. 30, 2021, 6 pages.

* cited by examiner

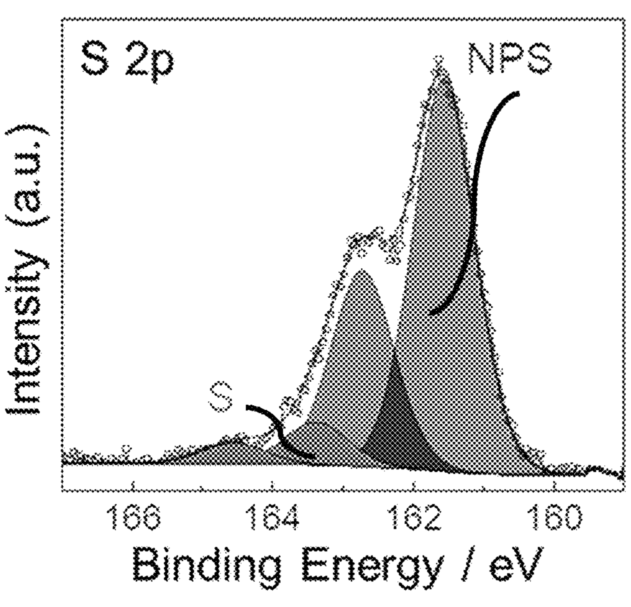
FIG. 6A
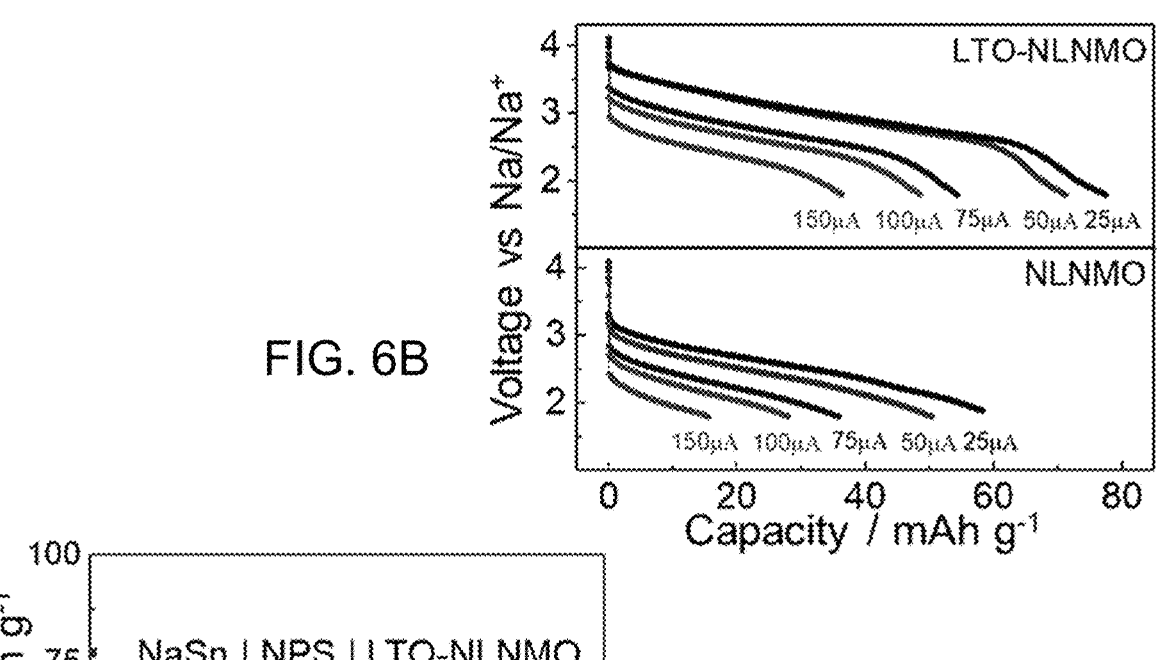
FIG. 6B
NaSn | NPS | LTO-NLNMO
50 μA cm-2
5.5 mg cm-2
Capacity / mAh g-1
Cycle No
FIG. 6C

INTERFACE PROTECTION FOR ALL-SOLID-STATE BATTERIES

RELATED APPLICATIONS

This application is a 371 national stage filing of International Application No. PCT/US2021/023279, filed Mar. 19, 2021, which claims the benefit of the priority of U.S. Application No. 62/992,868, filed Mar. 20, 2020, each of which is incorporated herein by reference in its entirety.

FIELD OF THE INVENTION

The present invention relates to a new coating process for protecting a high voltage sodium electrode-solid electrolyte interface.

BACKGROUND

For economic reasons, battery grid storage should ideally be based on commonly-available materials but also be capable of providing reasonably high energy densities and long cycle life. High voltage sodium all solid-state batteries would, in theory, meet these general concepts, however, there are currently no stable chemistries capable of achieving these goals. In particular, challenges arise from the poor chemical and electrochemical stabilities of the solid-state solid electrolytes vs. the high voltage sodium cathode.

A sodium ion secondary battery includes a positive transition metal oxide-based cathode, a negative metallic lithium anode, and a liquid electrolyte that is sodium ion conductive between the positive and negative electrodes. In such batteries, it is important for the design to ensure minimal temperature increase, because if a short circuit should occur, the liquid electrolyte is combustible. Compared to lithium, sodium ion batteries are especially attractive for use in electrochemical grid storage due to sodium's relative abundance in the earth's crust, i.e., 23,000 ppm vs. 20 ppm for Li. The drawback with sodium ion batteries is the danger presented by large scale utilization of such batteries in grid storage applications, and the resulting significant fire risk.

In an all solid-state battery (ASSB), a solid electrolyte is used instead of a liquid electrolyte, making the entire battery solid. The solid electrolyte is intrinsically non-flammable and can accommodate a wider temperature range, allowing it to function as electrochemical energy storage without the need for additional safety devices. Additionally, such solid-state batteries support much higher energy densities compared to sodium ion batteries based on liquid-based electrolytes. While considerable research has been directed toward development of ASSBs, the majority of the focus has been on lithium batteries. This is primarily due to the poor chemical and electrochemical stabilities between the solid-state electrolytes and sodium transition metal-based cathodes. As a result, most existing reports on sodium ASSBs utilize high temperature battery cycling, or low voltage cathodes, along with low cycle numbers.

There have been many options for coating protection layers described in the literature. Protective coating materials such as $Li_2SiO_3$, $Li_4Ti_5O_{12}$ (LTO), $LiTaO_3$. $LiAlO_2$, $Li_2O—ZrO_2$, and $LiNbO_3$ (LNO) have been previously proposed, but have only been tried and tested in lithium-based chemistries. Sodium-based ASSBs have for the most part been ignored, as evidenced by relatively fewer reports on sodium-based conductive coating materials in the literature. This, in turn, has resulted in very few reported cases of sodium ASSBs. Of those that have been reported, only low voltage applications (<3.5V) with few cycle numbers (20 to 100) are described.

SUMMARY

Cost effective all-solid-state sodium-ion batteries that operate at room temperature are appealing candidates for use in large-scale energy storage systems. The present invention provides an interfacial protective coating layer that is effective in preventing unwanted interfacial reactions between the solid-state electrolyte and cathode from occurring. Incorporation of the inventive coating into sodium-based ASSBs allows for room temperature operation, high voltage, and long cycle life.

In sulfide-based ASSBs, oxide anions from the cathode form stronger electrostatic attractions with sodium ions compared to sulfide anions based on the hard-soft acid base (HSAB) principle. Thus, transfer of sodium ions from sulfides to oxides continually occur until equilibrium is reached, creating a wide interfacial resistive layer and suppressing any ionic conduction across the interface. As the transfer of ions from sulfide to oxide anions is charge balanced by the electronic conductive network of the cathode material, incorporating the inventive electronically insulative but ionically conductive coating layer at the solid-state electrolyte (SSE)-cathode interface can prevent this suppression. Protective coatings on the cathode can also alleviate cation inter-diffusion problems along the SSE-cathode interface. Cation inter-diffusion occurs from exchange between the transition metal ions and SSE cations. Such inter-diffusions can occur over spatial scales of up to 100 nm, forming a highly resistive layer that blocks lithium from crossing the interface. The protective coating serves to prevent both the highly resistive layer from forming as well as to prevent unwanted cation inter-diffusion between the sulfide solid electrolyte and the high voltage cathode.

In an exemplary embodiment, $Li_4Ti_5O_{12}$ (LTO) material is applied to sodium ASSBs, a non-intuitive solution that has not been previously suggested. Despite not containing any sodium, the LTO material conducts sodium ions, allowing it to be applied to sodium-based chemistries. Use of the LTO coating allows high voltage sodium all solid-state battery applications (>4V) with long cycle life (>300) compared to the existing art.

In one aspect of the invention, a method for improving cycling stability of a sodium all-solid-state battery includes applying a LTO coating to a cathode of the battery. In some embodiments, the cathode may be NLNMO, and may further be $Na_{0.8}[Li_{0.12}Ni_{0.22}Mn_{0.66}]O_2$. The LTO coating is applied to particles of the cathode material prior to formation of the cathode. The LTO coating may be $Li_4Ti_5O_{12}$.

In another aspect of the invention, a coating for improving cycling stability of a sodium all-solid state battery (ASSB) comprises LTO applied to a cathode of the battery. The cathode may be NLNMO and may further be $Na_{0.8}[Li_{0.12}Ni_{0.22}Mn_{0.66}]O_2$. The LTO coating may be applied to particles of cathode material prior to formation of the cathode.

In still another aspect of the invention, a sodium all-solid state battery includes: a Na—Sn negative electrode; a NPS solid state electrolyte disposed between the positive electrode and the negative electrode; and a NLNMO positive electrode having a LTO coating incorporated therein. The battery may further include a carbon conductive additive disposed between the NPS solid electrolyte and the NLNMO positive electrode. In some embodiments, the cathode is $Na_{0.8}[Li_{0.12}Ni_{0.22}Mn_{0.66}]O_2$. The LTO coating may be applied to particles of positive electrode material prior to formation of the positive electrode. The LTO coating may be $Li_4Ti_5O_{12}$. In some embodiments, the NPS solid electrolyte is $Na_3PS_4$.

In yet another aspect of the invention, a method for fabricating a sodium all-solid state battery includes disposing within a mold, a composition comprising layers of an electrode powder comprising a metallic sodium alloy; a cathode powder comprising particles having a LTO coating thereon; a solid electrolyte powder; and a carbon conductive additive; and compressing the layers to form a cell. The composition may comprise a weight ratio of 10:16:1 of: the cathode powder, electrolyte powder, and carbon conductive additive, and an excess of the negative electrode powder. In some embodiments the metallic sodium alloy is Na—Sn. The cathode powder may be $Na_{0.8}[Li_{0.12}Ni_{0.22}Mn_{0.66}]O_2$, the LTO coating is $Li_4Ti_5O_{12}$, the solid electrolyte is $Na_3PS_4$.

The inventive approach enables high voltage sodium ASSBs to be used for low-cost grid energy storage applications. This LTO coating provides effective protection of the interface between the solid electrolyte and high voltage cathode, allowing long term cycling stability of the battery.

BRIEF DESCRIPTION OF THE DRAWINGS

FIG. 2A is a reactivity phase diagram, FIG. 2B plots electrochemical stability of LTO vs $Na/Na^+$ redox; and FIG. 2C plots electrochemical stability of NPS vs $Na/Na^+$ redox.

FIGS. 3A-3D illustrate the X-ray Photoelectron Spectroscopy (XPS) (FIG. 3A), X-ray Diffraction (XRD) (FIGS. 3B, 3C) and lattice parameters (FIG. 3D) of chemical and electrochemical degradation between the $Na_3PS_4$ solid-state electrolyte and the NLNMO cathode in the absence of the coating material.

FIGS. 6A-6C provide plots of performance measurements of the LTO coated NLNMO battery, in contrast with the performance without the coating material. FIG. 6A plots XPS S 2p region binding energies of NPS and LTO-NLNMO at charged states; FIG. 6B shows the improved rate capability of LTO-NLNMO compared to bare NLNMO; and FIG. 6C show the extended cell cycling performance of LTO-coated NLNMO.

DETAILED DESCRIPTION OF EMBODIMENTS OF THE INVENTION

Figure 1A:
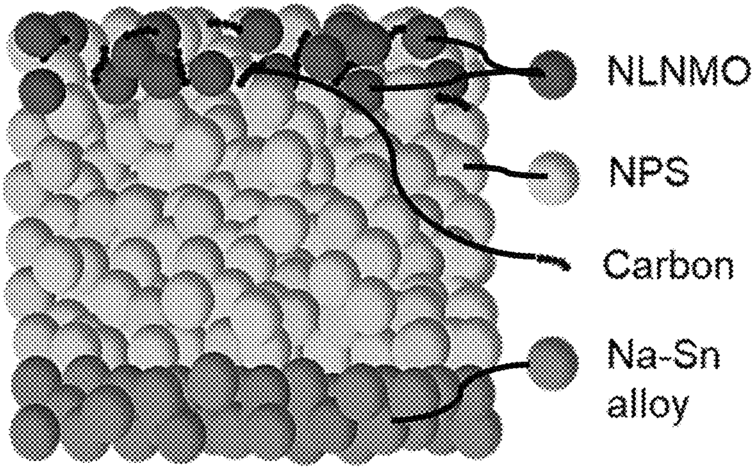
FIG. 1A is a schematic of solid-state cell setup in accordance with an embodiment of the invention.

Using a representative sodium solid-state battery designs comprising a metallic sodium-tin (Na—Sn) alloy, sulfide solid electrolyte ($Na_3PS_4$) and sodium transition metal oxide cathode $Na_{0.8}[Li_{0.12}Ni_{0.22}Mn_{0.66}]O_2$ (NLNMO) as the starting point, evaluation of the protective material is performed using both computational and experimental methods using characterization tools as well as electrochemical measurements. Such evaluations were probed using Raman spectroscopy, X-ray photoelectron spectroscopy (XPS), and X-ray diffraction (XRD) based off a computationally-guided protective coating (an additional oxide layer). STEM revealed that coating layer is amorphous and about 5 nm thick. After optimizing the coating process, the electrochemical performance of the cell dramatically improved, achieving a specific capacity comparable to that of the liquid cell while exhibiting 80% capacity retention after 300 cycles. This coating method can be an effective strategy for achieving higher electrochemical performance in room temperature all-solid-state Na-ion batteries.

The inventive method is applicable to a wide variety of sodium solid-state battery chemistries including those using: $Na_2Sx{\cdot}P_2S_5y$, $NaSbS_4$, $Na_3PS_4$, $Na_xP_zSi_zS_4$, $Na_3PS_4$—$Na_4SiS_4$, sulfide based solid electrolytes, $Na_{0.7}CoO_{2+x}$, $NaFePO_4$, $NaFe_xMn_yO_4$, $NaMnPO_4$, $Na_3V_2(PO_4)_3$, $Na_xNi_{0.5}Mn_{0.5}O_2$, $Na_{0.7}MnO_{2+x}$ based cathode materials, carbon, sodium alloy, or sodium metal based anode materials.

A battery was fabricated using a metallic sodium alloy (Na—Sn), a $Na_3PS_4$ (NPS) glass ceramic as the solid-state electrolyte, and a NLNMO cathode to demonstrate the technical concept in an ASSB. The average protecting coating thickness of LTO used is 5 nm on the surface of the cathode material. The coating material is applied to the cathode particles via sol-gel method, as is known in the art. First, stoichiometric amounts of sodium ethoxide and titanium isopropoxide are dispersed in anhydrous ethanol at 2-11 wt % relative to the sodium cathode amount. The solution is then mixed with the cathode material and dried under vacuum and at 60° C. to remove the solvent. Next, the coated cathode particles are annealed under heat treatment at 450° C. for 1 hour in ambient conditions.

An ASSB according to the present invention includes a NLNMO positive electrode, a Na—Sn negative electrode, and the above-described $Na_3PS_4$ solid state electrolyte interposed between the positive electrode and the negative electrode. In the exemplary embodiment, the ASSB is manufactured through a dry compression process, in which electrode powder and solid electrolyte powder are manufactured, introduced into a predetermined mold, and pressed in a composition of (10:16:1), in which 10 weight ratio of cathode electrode is used, 16 weight ratio of solid electrolyte is used, and 1 weight ratio of carbon conductive additive is used. An excess of Na—Sn alloy is used at the negative electrode. As will be apparent to those of skill in the art, any other well-known fabrication method may be used. In the exemplary process, the solid electrolyte is disposed between the positive electrode and the negative electrode and the layers are compressed at 370 MPa in order to assemble a cell. The assembled cell is encapsulated in a case of aluminum or stainless steel, or a prismatic metal container that can appropriately hold the cell. The cell is then electrochemically cycled and compared against an equivalent cell with and without the coating material to study its effects. After cycling, the cell was also removed for characterization studies to evaluate the effectiveness of the protecting coating material in preventing long term interfacial reactions.

Figure 1B:
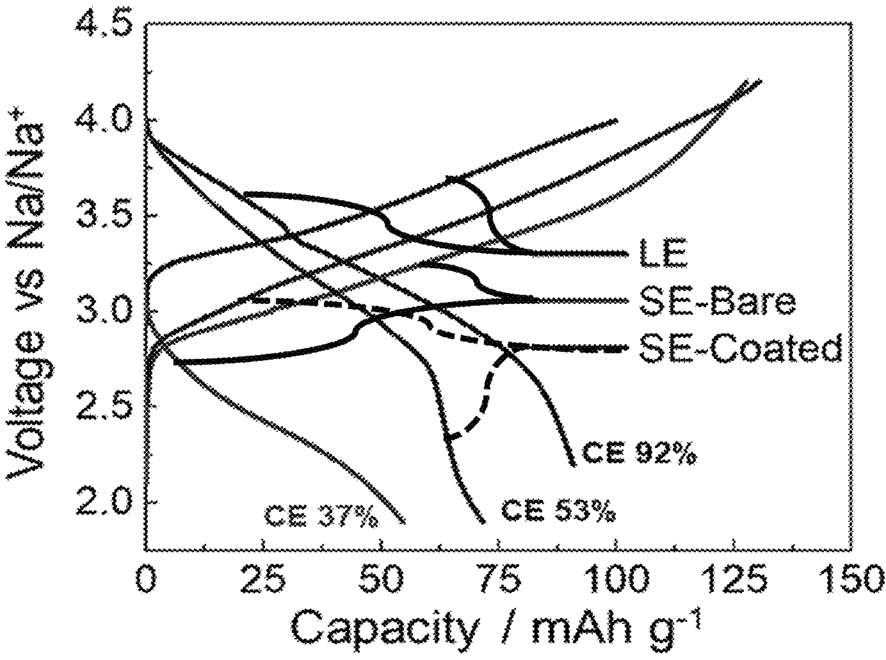
FIG. 1B plots voltage profile comparisons of NLNMO in liquid and solid electrolyte with and without protective coating layers. First cycle Coulombic efficiencies are displayed for reference.

FIG. 1A provides a schematic of solid-state cell setup according to an embodiment of the invention. This cell was manufactured using the same procedure described in the preceding section. FIG. 1B is a plot of voltage profile comparisons of NLNMO in liquid and solid electrolyte with and without protective coating layers. First cycle Coulombic efficiencies are displayed for reference. It can be seen that significant electrochemical improvements are achieved after incorporation of the coating material, where lower cell polarization, higher capacities, and high efficiencies are observed. This illustrates the effectiveness of the protective coating layer.

Figures 2A, 2B, 2C:
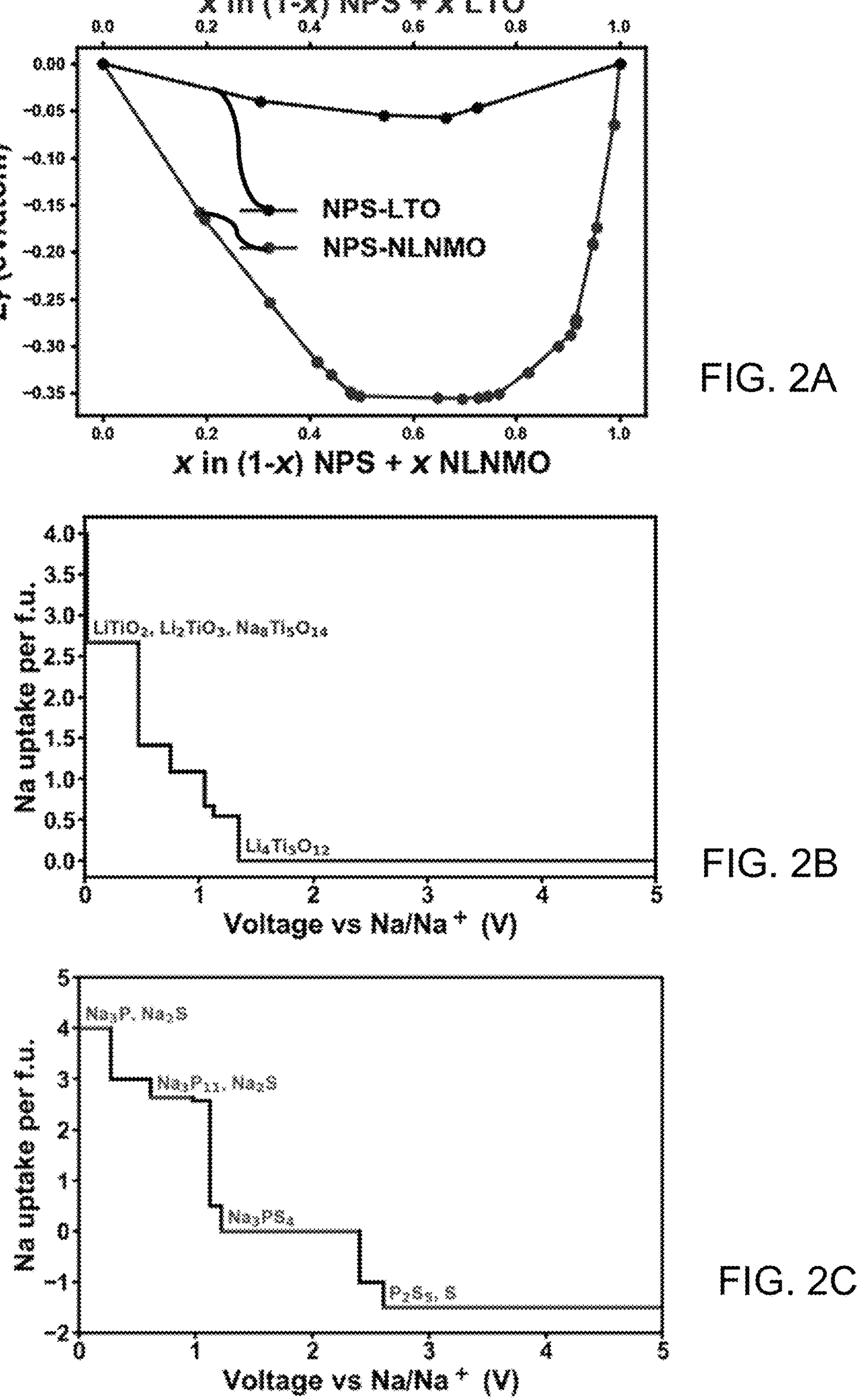
FIGS. 2A-2C are plots of computational density functional theory-based calculations to evaluate interfacial stability of the solid-electrolyte and cathode electrode interfacial with and without the protective coating layer, where

Computational density functional theory-based calculations were performed to evaluate interfacial stability of the solid-electrolyte and cathode electrode interfacial with and without the protective coating layer. FIG. 2A is a reactivity phase diagram between NPS-LTO and NPS-NLNMO. The free energies of reactions indicate the thermodynamic favorability of reaction between each material. As shown, reactivities between NPS-LTO are much less than NPS-NLNMO, indicating a higher interfacial stability can be expected after incorporation of the coating material between the solid-state electrolyte and the cathode electrode.

FIG. 2B plots electrochemical stability of LTO vs $Na/Na^+$ redox. This plot shows the intrinsically high thermodynamic stability of the LTO, which allows continuous long-term utility of the coating material to protect the interface between solid-state electrolyte and cathode electrode. FIG. 2C shows electrochemical stability of NPS vs $Na/Na^+$ redox. Unlike other oxide based solid-state electrolytes, the selected material $Na_3PS_4$ readily undergoes electrochemical decomposition when exposed to oxidative environment under high voltage. However, the computationally predicted products of $P_2S_5$ and S, both insulating compounds, prevent further degradation from occurring continuously and thus passivate the interface and allow continuous long-term cyclability of the battery.

FIGS. 3A-3D illustrate the X-ray Photoelectron Spectroscopy (XPS), X-ray Diffraction (XRD) and lattice parameters of chemical and electrochemical degradation between the $Na_3PS_4$ solid-state electrolyte and the NLNMO cathode in the absence of the coating material. These plots describe the reaction mechanisms of interfacial reactions in the absence of a protecting coating and can be compared against the extent of such reactions when the coating material is applied.

Figure 3A:
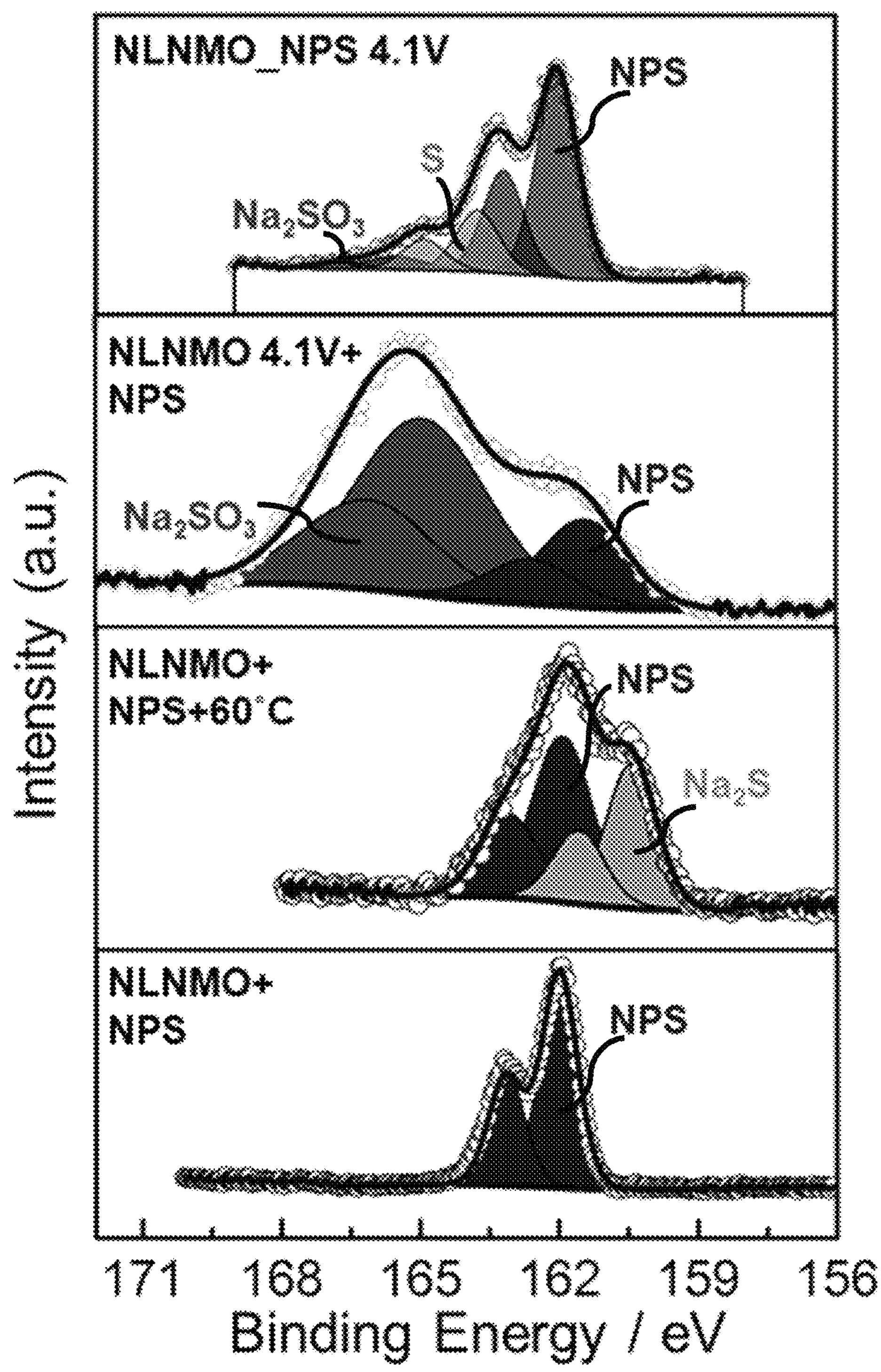

FIG. 3A plots the XPS S 2p region binding energies of $Na_3PS_4$ and NLNMO mixtures at bare and charged states. Upon mixture of $Na_3PS_4$ with uncoated NLNMO cathode material, spontaneous chemical reactions start to occur, producing unwanted side products such as $Na_2S$. Notably, the mixture was heated to 60° C. to increase the kinetics of any reactions in order to amplify them for XPS. Upon mixture of $Na_3PS_4$ with uncoated but charged NLNMO cathode material, more aggressive spontaneous chemical reactions start to occur, producing unwanted $Na_2SO_3$ side products. When the mixtures of $Na_3PS_4$ with uncoated NLNMO cathode material are charged together, typical of a normal cell, side products are also observed—$Na_2SO_3$ and S. These results indicate that $Na_3PS_4$ with uncoated NLNMO cathode material are intrinsically unstable with each other, with both chemical and electrochemical reactions occurring at their interface.

Figure 3D:
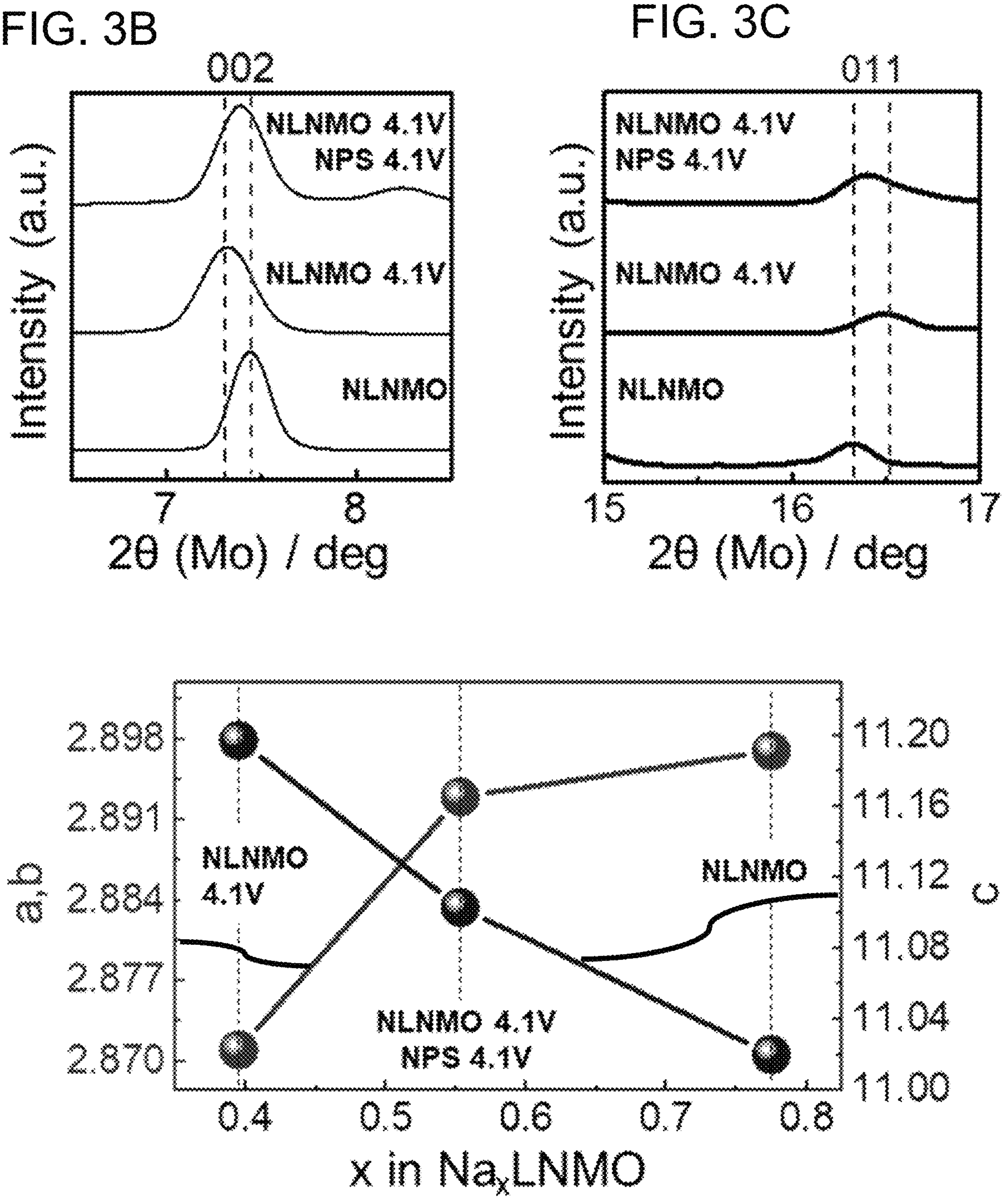

FIGS. 3B and 3C show enlarged XRD patterns of NPS and NLNMO mixtures at bare and charged states comparing their relative shifts of the (002) and (011) peaks, respectively. Upon charging of NLNMO alone, we can expect characteristic shifts in the (002) and (011) peaks due to lattice changes as a result of sodiation. However, when charged NLNMO is mixed with $Na_3PS_4$ according to the inventive method, the extent of this shift is significantly reduced, indicating that side reactions have occurred. The relative positions of each peak are illustrated in FIG. 3D, which provides a, b, and c lattice parameter comparisons of NPS and NLNMO mixtures at bare and charged states.

Figure 4A:
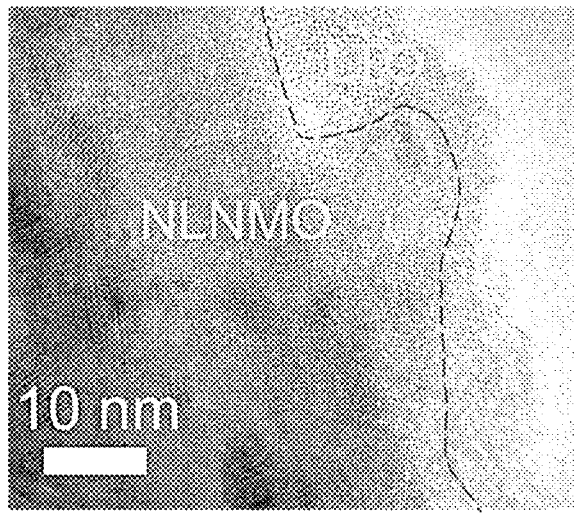
FIG. 4A is a TEM image of an exemplary interface coating.
Figure 4B:
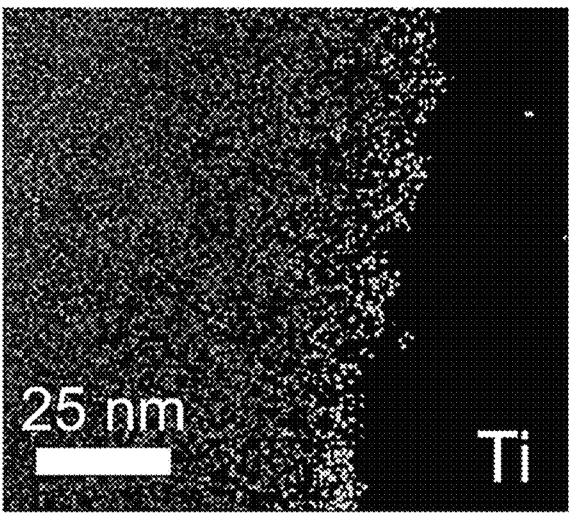
FIG. 4B shows an image generated from STEM-EDX mapping of the coating.
Figure 4C:
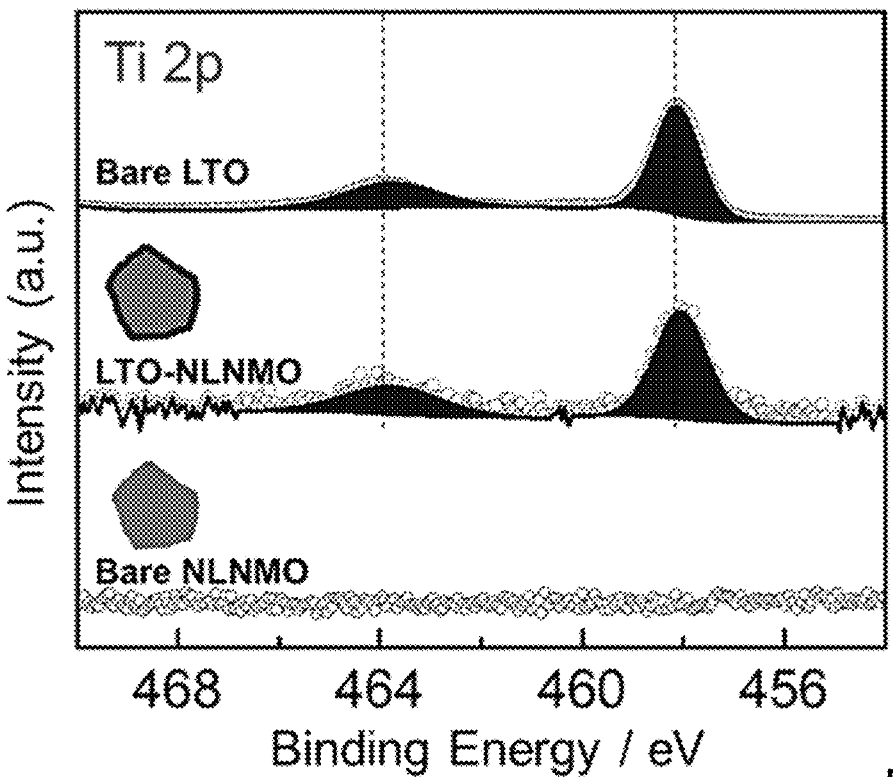
FIG. 4C compares the binding energies of Ti 2p region for bare LTO, LTO coated NLNMO and bare NLNMO.

FIGS. 4A-4C illustrate that a uniform and conformal 5 nm protective coating layer can be applied onto the surface of the sodium cathode material, protecting its interface against the $Na_3PS_4$ solid-state electrolyte. FIG. 4A is high resolution Transmission Electron Microscopy (TEM) image of amorphous LTO coated onto a NLNMO particle surface. The coating was applied via the sol-gel method described in the previous section. FIG. 4B is a Scanning Transmission Electron Microscopy (STEM)-Energy Dispersive X-ray mapping of Ti from LTO coated NLNMO is conducted. To differentiate the coating layer from the transition metal oxide layer, Ti is imaged as it is the primary component of the LTO coating easily distinguishable from the NLNMO cathode material, which does not contain any Ti. Thus, the coating indeed appears on the surface of the particle.

FIG. 4C plots XPS binding energies of Ti 2p region for bare LTO, LTO coated NLNMO and bare NLNMO. The inset at the vertical center of the plot is a schematic of the particle with coating. To ensure that the LTO coating material on the NLNMO cathode indeed matches the chemical signatures of pristine LTO, their binding energies (indicative of their relative oxidation states) are compared. It can be seen that the Ti 2p signals from the LTO coated NLNMO matches with the bare LTO material.

Figure 5:
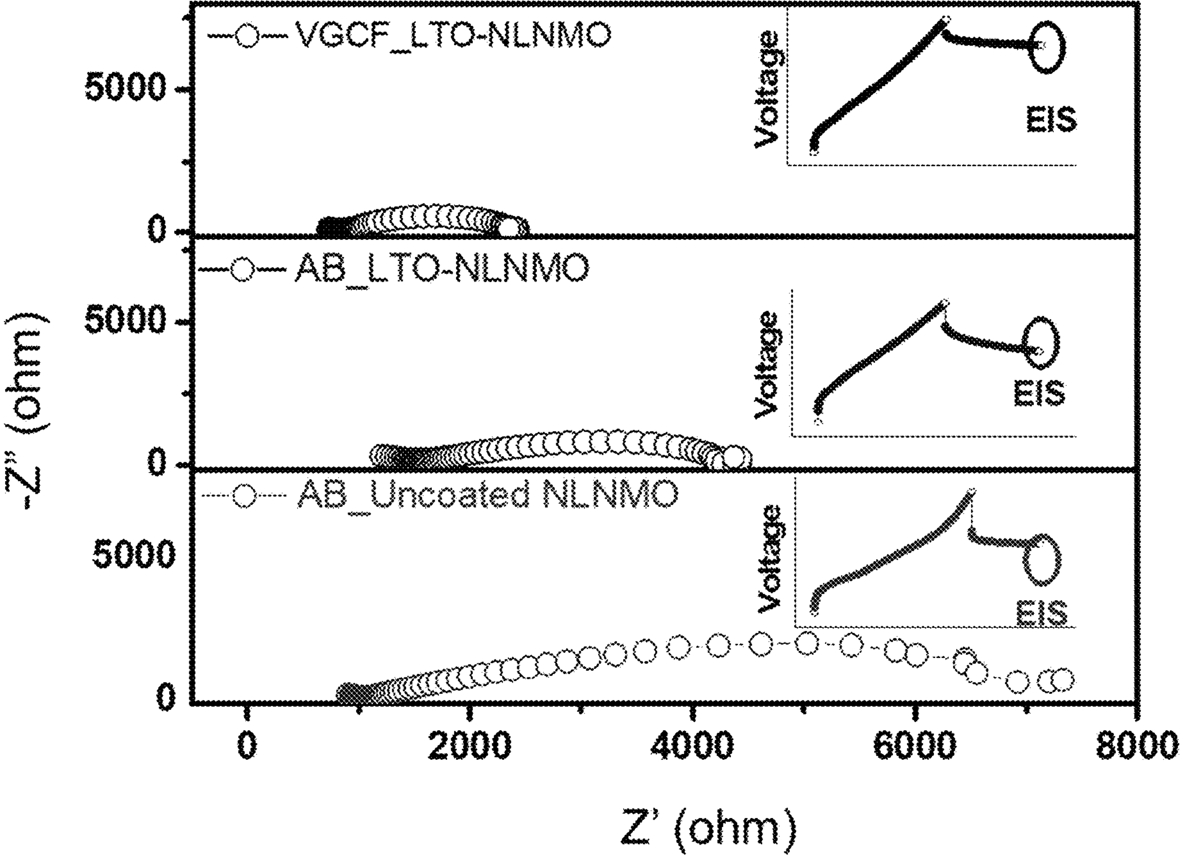
FIG. 5 provides a comparison of the cell level impedance for the inventive LTO coating versus bare material.

In FIG. 5, the LTO coating layer is shown to reduce cell level impedance compared to the bare material. This is reflected by lower polarization when the cell is cycled. The Nyquist plots (insets) show the comparative impedance measurements of an uncoated NLNMO battery with acetylene black carbon additive, a LTO-coated NLNMO battery with acetylene black carbon additive, and a LTO-coated NLNMO battery with vapor grown carbon fiber additive. Each measurement was taken after one full charge cycle, followed by allowing the cell to relax. These results illustrate that once the LTO coating is applied in the cell, the impedance growth is significantly reduced.

FIGS. 6A-6C provide performance measurements of the LTO coated NLNMO battery, in contrast with the performance without the coating material. FIG. 6A plots XPS S 2p region binding energies of NPS and LTO-NLNMO at charged states, showing absence of interfacial products. This is in large contrast with FIG. 3A, where significantly higher quantities of interfacial products are found.

FIG. 6B shows the improved rate capability of LTO-NLNMO compared to bare NLNMO. It can be seen that all discharge conditions of the LTO-coated NLNMO exhibit lower polarization and higher capacity compared to the uncoated cathode. FIG. 6C plots extended cell cycling performance of LTO-coated NLNMO, demonstrating good stability and long term cycle life of the LTO coated NLNMO ASSB.

Table 1 provides a list that compares the performance between the LTO-coated cathode according to the present invention and other various sodium transition metal-based cathode materials. As indicated, the NLNMO cathode battery described herein exhibits 60% retention after 300 cycles.

TABLE 1

| Cathode | Anode | Solid Electrolyte | Voltage/ V | Capacity (mAh/g) | Retention (cycle no) | Temp/ ° C. |
|---|---|---|---|---|---|---|
| $NaCrO_2$ | Na-Sn | $Na_3SbS_4$ | 3.1 | 106 | 57% (20) | RT |
| $NaCrO_2$ | Na-Sn | $Na_3PS_4$ | 3.1 | 90 | 66% (20) | RT |
| $Na._{2+2\delta}Fe_{2-\delta}(SO_4)_3$ | $Na_2Ti_3O_7$ | $Na_{3.1}Sn_{0.1}P_{0.9}S_4$ | 3.1 | 114 | 21% (100) | RT |
| NLNMO | Na-Sn | $Na_3PS_4$ | 4.1 | 78 | 60% (300) | RT |

The improved all solid-state batteries incorporating the novel interface protection provide an important solution for low-cost, safe and robust energy storage capable of operating under any climate. Scalable, sustainable designs can thus be enabled, in addition to being fully recyclable. This can be a solution for homes, the grid, and a variety of distributed energy storage needs.

REFERENCES (INCORPORATED HEREIN BY REFERENCE)

1 Noguchi, Y., Kobayashi, E., Plashnitsa, L. S., Okada, S. & Yamaki, J.-i. Fabrication and performances of all solid-state symmetric sodium battery based on NASICON-related compounds. *Electrochimica Acta* 101, 59-65, doi:10.1016/j.electacta.2012.11.038 (2013).

2 Lalère, F. et al. An all-solid state NASICON sodium battery operating at 200° C. *Journal of Power Sources* 247, 975-980, doi:10.1016/j.jpowsour.2013.09.051 (2014).

3 Zhou, W., Li, Y., Xin, S. & Goodenough, J. B. Rechargeable Sodium All-Solid-State Battery. *ACS Cent Sci* 3, 52-57, doi:10.1021/acscentsci.6b00321 (2017).

4 Gao, H., Xin, S., Xue, L. & Goodenough, J. B. Stabilizing a High-Energy-Density Rechargeable Sodium Battery with a Solid Electrolyte. *Chem* 4, 833-844, doi:10.1016/j.chempr.2018.01.007 (2018).

5 Banerjee, A. et al. Na3SbS4: A Solution Processable Sodium Superionic Conductor for All-Solid-State Sodium-Ion Batteries. *Angew Chem Int Ed Engl* 55, 9634-9638, doi:10.1002/anie.201604158 (2016).

6 Duchêne, L. et al. A stable 3 V all-solid-state sodium-ion battery based on a closo-borate electrolyte. *Energy & Environmental Science* 10, 2609-2615, doi:10.1039/c7ee02420g (2017).

7 Zhang, D. et al. Synthesis of cubic Na3SbS4 solid electrolyte with enhanced ion transport for all-solid-state sodium-ion batteries. *Electrochimica Acta* 259, 100-109, doi:10.1016/j.electacta.2017.10.173 (2018).

8 Chi, X. et al. Tailored Organic Electrode Material Compatible with Sulfide Electrolyte for Stable All-Solid-State Sodium Batteries. *Angew Chem Int Ed Engl* 57, 2630-2634, doi:10.1002/anie.201712895 (2018).

9 Rao, R. P., Chen, H., Wong, L. L. & Adams, S. Na3+xMxP1-xS4 (M=Ge4+, Ti4+, Sn4+) enables high rate all-solid-state Na-ion batteries Na2+2δFe2-δ(SO4)3|Na3+xMxP1-xS4|Na2Ti3O7. *Journal of Materials Chemistry A* 5, 3377-3388, doi:10.1039/c6ta09809f (2017).

10 Yue, J. et al. Long Cycle Life All-Solid-State Sodium Ion Battery. *ACS Appl Mater Interfaces* 10, 39645-39650, doi:10.1021/acsami.8b12610 (2018).

The invention claimed is:

1. A method for improving cycling stability of a sodium all-solid-state battery (ASSB), comprising:
   - applying a LTO coating to a cathode of the battery using a sol-gel process comprising:
     - mixing particles of cathode material in a solution of sodium ethoxide and titanium isopropoxide in anhydrous ethanol solvent to create coated particles;
     - drying and vacuum removing residual solvent from the coated particles;
     - annealing the coated particles at heat under ambient conditions;
     - disposing within a mold powder layers comprising:
       - an excess of an electrode powder comprising a metallic sodium alloy to define an electrode;
       - 16 weight ratio of a solid electrolyte powder and 1 weight ratio of a carbon conductive additive to define a solid electrolyte; and
       - 10 weight ratio of the annealed coated particles to define the cathode; and
     - dry compressing the layers to form an ASSB cell, wherein the LTO coating prevents formation of a lithium-blocking resistive layer at an interface between the cathode and the solid electrolyte.

2. The method of claim 1, wherein the cathode is NLNMO.

3. The method of claim 1, wherein the cathode is $Na_{0.8}[Li_{0.12}Ni_{0.22}Mn_{0.66}]O_2$.

4. The method of claim 1, wherein the LTO coating is $Li_4Ti_5O_{12}$.

5. A method for improving cycling stability of a sodium all-solid state battery (ASSB), the method comprising:
   - applying a coating comprising LTO to a cathode of the battery, wherein the coating is applied by a sol-gel process comprising:
     - mixing particles of cathode material in a solution of sodium ethoxide and titanium isopropoxide in anhydrous ethanol solvent to create coated particles;
     - drying and vacuum removing residual solvent from the coated particles;
     - annealing the coated particles at heat under ambient conditions;
   - disposing within a mold powder layers comprising an excess of an electrode powder comprising a metallic sodium alloy to define an electrode, 16 weight ratio of a solid electrolyte powder and 1 weight ratio of a carbon conductive additive to define a solid electrolyte, and 10 weight ratio of the annealed coated particles to define the cathode; and
   - dry compressing the powder layers to form an ASSB cell, wherein the LTO coating prevents formation of a lithium-blocking resistive layer at an interface between the cathode and the solid electrolyte.

6. The coating of claim 5, wherein the cathode is NLNMO.

7. The coating of claim 5, wherein the cathode is $Na_{0.8}[Li_{0.12}Ni_{0.22}Mn_{0.66}]O_2$.

8. The method of claim 1, wherein the solution comprises stoichiometric amounts of sodium ethoxide and titanium isopropoxide in anhydrous ethanol solvent at 2-11 wt % relative to a volume of cathode material.

9. The method of claim 1, wherein the annealing step is performed at 450° C. for 1 hour.

10. The method of claim 5, wherein the solution comprises stoichiometric amounts of sodium ethoxide and titanium isopropoxide in anhydrous ethanol solvent at 2-11 wt % relative to a volume of cathode material.

11. The method of claim 5, wherein the annealing step is performed at 450° C. for 1 hour.

* * * * *